United States Patent
Chen

(10) Patent No.: US 6,625,721 B1
(45) Date of Patent: Sep. 23, 2003

(54) REGISTERS FOR 2-D MATRIX PROCESSING

(75) Inventor: George K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/360,612

(22) Filed: Jul. 26, 1999

(51) Int. Cl.$^7$ .............................................. G06F 7/00
(52) U.S. Cl. ...................................... 712/10; 708/232
(58) Field of Search .................................. 712/10; 708/5, 708/232; 382/250

(56) References Cited

U.S. PATENT DOCUMENTS

| | | | |
|---|---|---|---|
| 3,763,365 A | * 10/1973 | Seitz | 708/607 |
| 4,769,790 A | * 9/1988 | Yamashita | 365/189.12 |
| 4,837,845 A | * 6/1989 | Pruett | 382/297 |
| 5,481,487 A | 1/1996 | Jang et al. | 708/401 |
| 5,590,066 A | * 12/1996 | Ohki | 708/401 |
| 5,668,748 A | * 9/1997 | Huang | 708/402 |
| 5,764,553 A | * 6/1998 | Hong | 375/240.07 |
| 5,805,476 A | * 9/1998 | Kim et al. | 708/200 |
| 5,875,355 A | 2/1999 | Sidwell et al. | 712/300 |
| 6,021,420 A | * 2/2000 | Takamuki | 708/401 |
| 6,292,433 B1 | * 9/2001 | Gilbert et al. | 367/138 |

FOREIGN PATENT DOCUMENTS

| | | |
|---|---|---|
| WO | 98/18074 | 4/1998 |
| WO | 99/48025 | 9/1999 |
| WO | 99/66393 | 12/1999 |

OTHER PUBLICATIONS

"Simultaneous Register Read Access", IBM Technical Disclosure Bulletin, May 1, 1990, pp. 312–313, vol. 32, No. 12, IBM Corp., New York, USA.

* cited by examiner

Primary Examiner—Eric Coleman
(74) Attorney, Agent, or Firm—Steven P. Skabrat

(57) ABSTRACT

A processor has at least two sets of registers. The first set stores a matrix of data, and the second set stores a transposed copy of the matrix of data. When any portion of any row of the first set is modified, the corresponding portion of the column of the transposed copy in the second set is also automatically modified. A method of using two sets of registers for matrix processing by a processor includes storing a matrix of data into a first set of registers, the first set of registers having a first number of registers, each register comprising a first number of storage units, each storage unit storing an element of the matrix, and transposing the matrix of data into a second set of registers, the second set of registers having a second number of registers, each register comprising a second number of storage units. The method also includes referencing one of the first set of registers to operate on a row of the matrix of data, and referencing one of the second set of registers to operate on a column of the matrix of data.

47 Claims, 5 Drawing Sheets

Figure 1
(Prior Art)

| | | | | | | | |
|---|---|---|---|---|---|---|---|
| P0,0 | P0,1 | P0,2 | P0,3 | P0,4 | P0,5 | P0,6 | P0,7 |
| P1,0 | P1,1 | P1,2 | P1,3 | P1,4 | P1,5 | P1,6 | P1,7 |
| P2,0 | P2,1 | P2,2 | P2,3 | P2,4 | P2,5 | P2,6 | P2,7 |
| P3,0 | P3,1 | P3,2 | P3,3 | P3,4 | P3,5 | P3,6 | P3,7 |
| P4,0 | P4,1 | P4,2 | P4,3 | P4,4 | P4,5 | P4,6 | P4,7 |
| P5,0 | P5,1 | P5,2 | P5,3 | P5,4 | P5,5 | P5,6 | P5,7 |
| P6,0 | P6,1 | P6,2 | P6,3 | P6,4 | P6,5 | P6,6 | P6,7 |
| P7,0 | P7,1 | P7,2 | P7,3 | P7,4 | P7,5 | P7,6 | P7,7 |

Figure 2

|      | 16  LOW UNIT |      |      | 10   |      |      |      | 18  HIGH UNIT |
|------|------|------|------|------|------|------|------|------|
| MM0  | P0,0 | P1,0 | P2,0 | P3,0 | P4,0 | P5,0 | P6,0 | P7,0 |
| MM1  | P0,1 | P1,1 | P2,1 | P3,1 | P4,1 | P5,1 | P6,1 | P7,1 |
| MM2  | P0,2 | P1,2 | P2,2 | P3,2 | P4,2 | P5,2 | P6,2 | P7,2 |
| MM3  | P0,3 | P1,3 | P2,3 | P3,3 | P4,3 | P5,3 | P6,3 | P7,3 |
| MM4  | P0,4 | P1,4 | P2,4 | P3,4 | P4,4 | P5,4 | P6,4 | P7,4 |
| MM5  | P0,5 | P1,5 | P2,5 | P3,5 | P4,5 | P5,5 | P6,5 | P7,5 |
| MM6  | P0,6 | P1,6 | P2,6 | P3,6 | P4,6 | P5,6 | P6,6 | P7,6 |
| MM7  | P0,7 | P1,7 | P2,7 | P3,7 | P4,7 | P5,7 | P6,7 | P7,7 |

Figure 3

|  | LOW UNIT | | | | | | | HIGH UNIT |
| --- | --- | --- | --- | --- | --- | --- | --- | --- |
| VM0 | P0,0 | P1,0 | P2,0 | P3,0 | P4,0 | P5,0 | P6,0 | P7,0 |
| VM1 | P0,1 | P1,1 | P2,1 | P3,1 | P4,1 | P5,1 | P6,1 | P7,1 |
| VM2 | P0,2 | P1,2 | P2,2 | P3,2 | P4,2 | P5,2 | P6,2 | P7,2 |
| VM3 | P0,3 | P1,3 | P2,3 | P3,3 | P4,3 | P5,3 | P6,3 | P7,3 |
| VM4 | P0,4 | P1,4 | P2,4 | P3,4 | P4,4 | P5,4 | P6,4 | P7,4 |
| VM5 | P0,5 | P1,5 | P2,5 | P3,5 | P4,5 | P5,5 | P6,5 | P7,5 |
| VM6 | P0,6 | P1,6 | P2,6 | P3,6 | P4,6 | P5,6 | P6,6 | P7,6 |
| VM7 | P0,7 | P1,7 | P2,7 | P3,7 | P4,7 | P5,7 | P6,7 | P7,7 |

Figure 5

REGISTERS FOR 2-D MATRIX PROCESSING

BACKGROUND

1. Field

The present invention relates generally to computer systems and, more specifically, to processor architectures.

2. Description

Some processors are designed to provide extensions to their instruction set architecture (ISA) for multimedia operations. For example, the MMX™ instructions supported by Pentium® II, Pentium® III, and Celeron™ processors, commercially available from Intel Corporation of Santa Clara, Calif., implement various functions useful for multimedia applications, such as digital signal processing, and audio and video processing. These instructions support "single instruction multiple data" (SIMD) operations on multimedia and communications data types. Although the use of these instructions provide an improvement over combinations of pre-existing instructions to perform a given function, and individual MMX™ instructions are efficient for some types of processing, various impediments to faster multimedia processing still remain. For example, many implementations of block-based image and video processing algorithms (such as joint photographic experts group (JPEG) and moving picture expert group (MPEG) schemes) result in the data, stored in a set of registers accessible as operands for the MMX™ instructions, being transposed during matrix mathematical operations. The transposition of data among registers incurs significant overhead, however, thereby slowing overall processor throughput for multimedia processing. Therefore, any techniques for avoiding or minimizing these delays would be a valuable advance in the processor art.

SUMMARY

An embodiment of the present invention is a processor having a first set of registers, the first set storing a matrix of data, and a second set of registers coupled to the first set, the second set storing a transposed copy of the matrix of data.

Another embodiment of the present invention is a method of using two sets of registers for matrix processing by a processor. The method includes storing a matrix of data into a first set of registers, the first set of registers having a first number of registers, each register comprising a first number of storage units, each storage unit storing an element of the matrix, and transposing the matrix of data into a second set of registers, the second set of registers having a second number of registers, each register comprising a second number of storage units. The method also includes referencing one of the first set of registers to operate on a row of the matrix of data, and referencing one of the second set of registers to operate on a column of the matrix of data.

BRIEF DESCRIPTION OF THE DRAWINGS

The features and advantages of the present invention will become apparent from the following detailed description of the present invention in which:

FIG. 1 is a diagram of a set of MMX™ registers according to the prior art;

FIG. 2 is a diagram of the set of MMX™ registers storing an 8 pixel by 8 pixel block of image data;

FIG. 3 is a diagram of the set of MMX™ registers storing the transposed 8 pixel by 8 pixel block of image data;

FIG. 5 is a diagram of the set of virtual MMX™ registers storing the transposed 8 pixel by 8 pixel block of image data.

DETAILED DESCRIPTION

Figure 4:
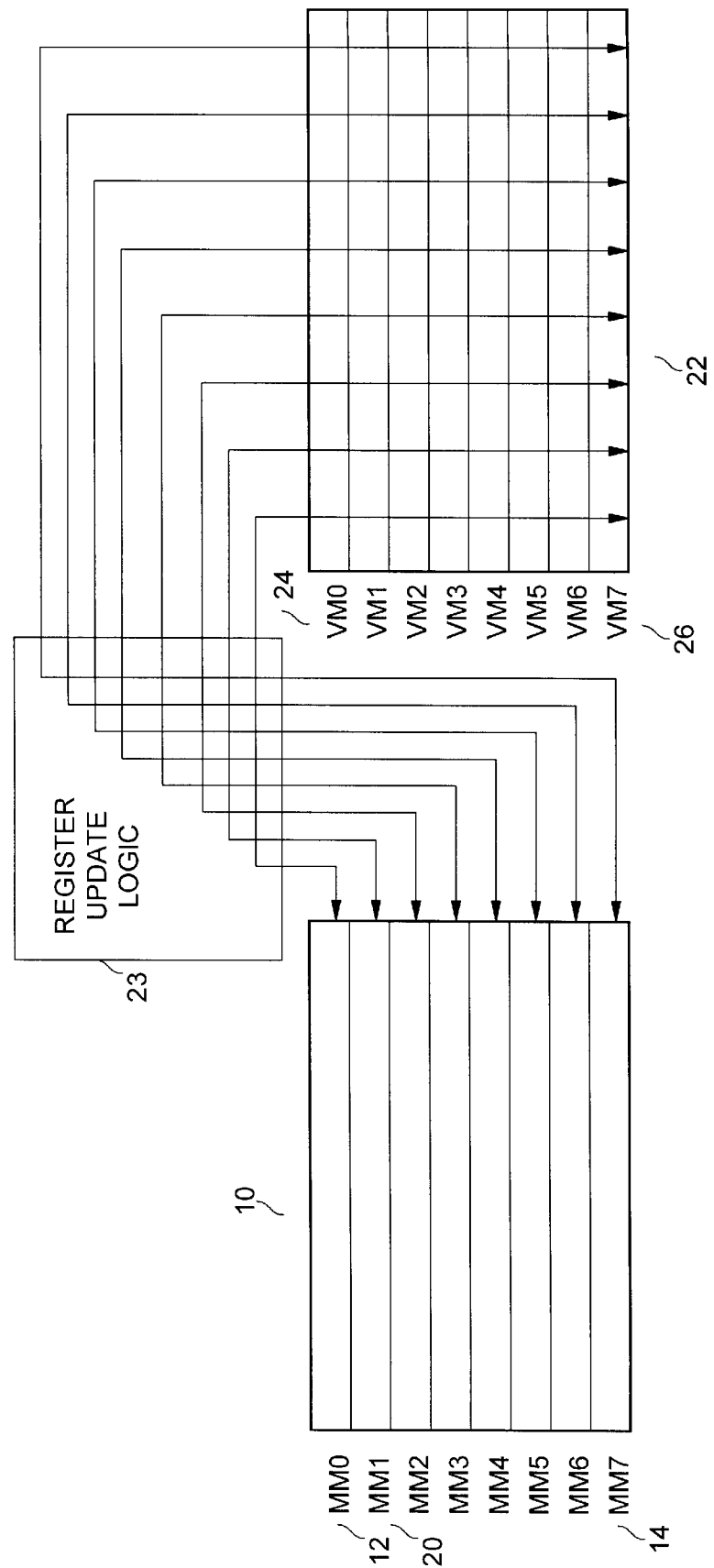
FIG. 4 is a diagram of a virtual MMX™ register set linked to the MMX™ register set according to an embodiment of the present invention.

An embodiment of the present invention comprises a method and apparatus for extending MMX™ registers to be more efficient for two dimensional (2-D) matrix operations.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

When executing an instruction, a processor typically references one or more register operands. For MMX™ instructions, the register operands may be one or more of a special set of registers called MMX™ registers. FIG. 1 is a diagram of a set of MMX™ registers according to the prior art. In the register set 10 shown in FIG. 1, there are eight MMX™ registers labeled mm0 12 through mm7 14. In other embodiments, the number of registers may be higher or lower than eight. Each register includes a plurality of units of data, ordered from a low unit 16 to a high unit 18 as shown. In one embodiment, a unit comprises a byte. In other embodiments, a unit may comprise a word, a double word, or other storage unit. In at least one known system, the number of units (e.g., bytes) per MMX™ register is eight, although in other systems other numbers of units may be employed. To efficiently implement SIMD multimedia processing using the MMX™ registers, data to be processed should be aligned in such a way that multiple related data items are arranged in a single MMX™ register. For example, suppose an 8 pixel by 8 pixel block of image data is laid out in the MMX™ registers as shown in FIG. 2, with each pixel value P(i, j) being represented in one unit and the overall set of registers representing a matrix. The 8 pixel by 8 pixel block may be a portion of a larger image. In this example, the first row of image data of the block is stored in the first MMX™ register, mm0 12, with the first column of the first row being stored in the low unit of mm0 and the last column of the first row being stored in the high unit of mm0, the second row of image data is stored in the second MMX™ register, mm1 20, with the first column of the second row being stored in the low unit of mm1 and the last column of the second row being stored in the high unit of mm1, and so on.

Once the data is stored in the MMX™ registers as shown, the processor may execute instructions to efficiently operate on the 8×8 matrix one row at a time. This type of processing is commonly used in block-based imaging applications, for example, as well as other applications. For example, all of the data of row 0 may be added to the data of row 3 using a single MMX™ instruction as shown below.

PADDB MM0, MM3 ; add row 0 to row 3 and store results in row 0.

However, to operate on the 8×8 matrix one column at a time presents problems because each column's data is spread out among the eight MMX™ registers. For example, the first column's data is distributed among the low units of mm0 12 through mm7 14, and the last column's data is distributed among the high units of mm0 through mm7, respectively. To continue to gain the benefits of using MMX™ SIMD processing, it becomes necessary to transpose the 8×8 matrix as shown in FIG. 3. Matrix transposition is well known in mathematics. After transposition, the first MMX™ register mm0 12 stores the original first column of data, with the first row of the original first column being stored in the low unit 16 and the last row of the original first column being stored in the high unit 18 as shown. Similarly, the other MMX™ registers store columns of the 8×8 matrix as shown.

Although an 8×8 matrix transposition may be performed using known pack and unpack instructions, this processing is very inefficient and incurs significant processing overhead. Generally, transposition processing for an 8×8 matrix may be implemented by the performance of four 4×4 matrix transpositions, with each transposition requiring at least 12 processing cycles on a Pentium®III processor. Thus, at least 64 cycles are used merely to reposition the data so that an MMX™ instruction may be used to operate on the eight elements of a given column.

Embodiments of the present invention overcome the need to transpose the data in the MMX™ registers through a series of pack and unpack instructions by providing an additional set of registers in the processor to assist in multimedia processing. In embodiments of the present invention, an equivalent "mirror" set of the MMX™ registers is designed into the processor architecture. This register set may be called the virtual MMX register set, or VMX set. FIG. 4 is a diagram of the virtual MMX register set linked to the MMX™ register set according to an embodiment of the present invention. In one embodiment, the number of MMX™ registers in MMX™ register set 10 is the same as the number of VMX registers provided in VMX register set 22. In addition, in one embodiment, the number of VMX registers is greater than or equal to the number of units in each MMX™ register (with a unit being a byte, word, double word, or other storage unit, depending on the implementation). VMX register set 22 stores the transposed matrix data from the MMX™ register set and may be automatically updated by register update logic 23 whenever any unit of any register in the MMX™ set is modified. Hence, a load of one row of MMX™ register set 10 automatically results in a load of one column of VMX register set 22. For example, the data from the first MMX™ register mm0 12 may be automatically stored in the low units of the VMX registers VM0 through VM7, the data from the second MMX™ register mm1 20 may be automatically stored in the second lowest units of the VMX registers, and so on.

Referring back to FIG. 2, if the MMX™ registers are loaded with an 8×8 matrix designated P0,0 to P7,7 as shown, then the VMX registers may be automatically loaded by register update logic with the transposed matrix as shown in FIG. 5. To operate on row elements of the matrix, a program may simply reference one or more of MMX™ registers mm0 12 through mm7 14. However, to operate on column elements of the matrix, a program references the VMX registers vm0 24 through vm7 26, instead. Since the MMX™ registers are mirrored in the processor hardware with the VMX registers, there are no coherency issues. All MMX™ instructions may be operated with either of the register sets by using references to the appropriate registers as needed. No changes to the instruction set of the processor are needed, only operand references may be changed in a program.

One advantage of embodiments of the present invention over existing processor architectures is that the invention provides greater parallelism for matrix operations. This is achieved by avoiding costly transposes for column operations through the execution of multiple pack and unpack instructions.

One example of how the present invention may be employed is in the Discrete Cosine Transform (DCT) algorithm used for processing 8 pixel by 8 pixel blocks in many video processing schemes. Currently, to perform an 8×8 DCT, processing includes performing a 1×8 column transform first, transposing the 8×8 matrix, performing another 1×8 column transform, and then transposing the results again to get the DCT coefficients. The most optimized DCT currently running on Pentium® class processors takes about 300 cycles of processing. Of this amount, about 100 cycles are used to perform the transpose operations for an 8×8 matrix. Thus, implementation of the present invention yields an approximately 30% improvement for the DCT processing. Similar performance gains may be achieved for inverse DCTs. Although the example of a DCT is discussed herein, embodiments of the present invention may be useful for any matrix operations, including those used in various image and video compressions algorithms.

Although the present invention has been discussed above in the context of a two dimensional (2-D) matrix, the concept may be adapted to three or more dimensions. For example, a third register set may be included in the design of the processor to store other transpositions of the matrix data.

Figure 6:
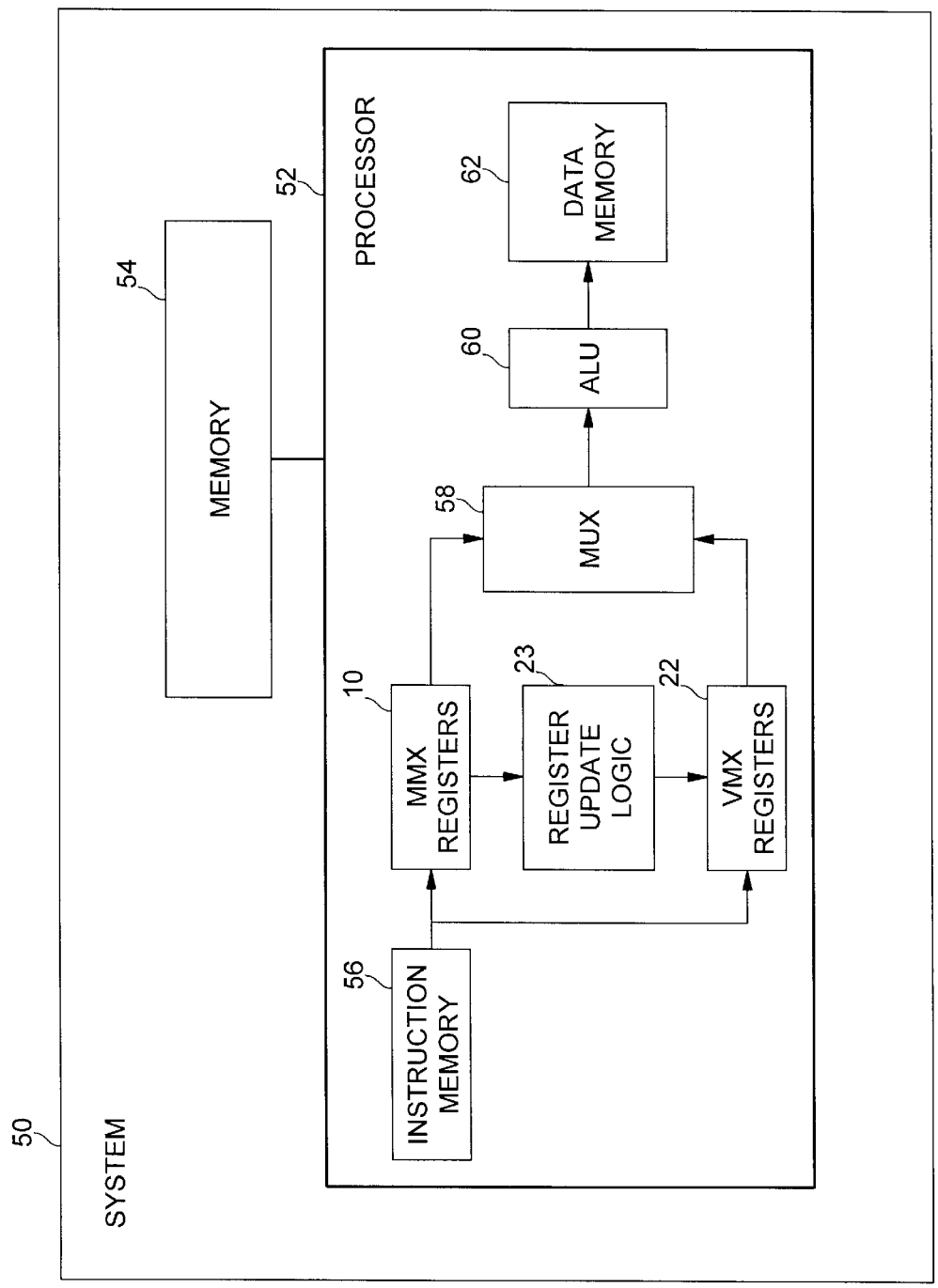
FIG. 6 is a diagram of a system having a processor with a MMX™ register set and a virtual MMX™ register set according to an embodiment of the present invention.

FIG. 6 is a diagram of a system having a processor with a MMX™ register set and a virtual MMX™ register set according to an embodiment of the present invention. System 50 may include processor 52 coupled to memory 54. Processor 52 comprises various components well-known in the art, many of which have been omitted from FIG. 6 for clarity. Instruction memory 56 stores instructions that may reference one or more of MMX™ registers 10 or one or more of VMX registers 22. Register update logic 23 coordinates the automatic updating of the VMX registers 22 when the MMX™ registers change. Multiplexor (MUX) 58 selects data from either MMX™ registers or VMX registers for input to arithmetic logic unit (ALU) 60. The ALU produces data for data memory 52.

The present invention allows MMX™ registers to be manipulated in a more intuitive manner. With the addition of the mirror register set, implementation of any block-based algorithms may be simplified and their performance increased. Some examples of applications which may benefit from the present invention include discrete cosine transforms (DCTs) used in video compression algorithms, matrix transforms in three dimensional (3-D) graphics algorithms, and others.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A processor comprising:
   a first set of registers storing a matrix of data;
   a second set of registers storing a transpose of the matrix of data; and
   logic that automatically modifies the second set of registers, so as to maintain the transposition relationship between the matrix of data stored in the first set of registers and the transpose of the matrix of data stored in the second set of registers, in response to a modification of the first set of register.

2. The processor of claim 1, wherein a modification of a row of the matrix of data in the first set of registers automatically results in a corresponding modification of a column of the transpose of the matrix of data in the second set of registers.

3. The processor of claim 1, wherein the first set of registers comprises a first number of registers, each register comprising a first number of storage units, the second set of registers comprises a second number of registers, each register comprising a second number of storage units, and the second number of storage units is greater than or equal to the first number of registers.

4. The processor of claim 3, wherein the first number of registers is equal to the second number of registers.

5. The processor of claim 4, wherein the first set of registers comprise MMX™ registers, the first number of registers is eight, and the matrix of data comprises image data.

6. The processor of claim 1, wherein the processor executes an instruction referencing one of the first set of registers to operate on a row of the matrix of data and executes an instruction referencing one of the second set of registers to operate on a column of the matrix of data.

7. A method of using two sets of registers for matrix processing by a processor comprising:
   storing a matrix of data into a first set of registers, the first set of registers comprising a first number of registers, each register comprising a first number of storage units, each storage unit storing an element of the matrix;
   transposing the matrix of data into a second set of registers, the second set of registers comprising a second number of registers, each register comprising a second number of storage units;
   automatically modifying the second set of registers, so as to maintain the transposition relationship between the matrix of data stored in the first set of registers and the transpose of the matrix of data stored in the second set of registers, in response to a modification of the first set of registers;
   referencing one of the first set of registers to operate on a row of the matrix of data; and
   referencing one of the second set of registers to operate on a column of the matrix of data.

8. The method of claim 7, further comprising modifying a row of the matrix of data in the first set of registers and automatically modifying a corresponding column of the transpose of the matrix of data in the second set of registers.

9. The method of claim 7, further comprising performing a transform operation on column data stored in one of the second set of registers.

10. The method of claim 9, wherein performing the transform operation comprises performing a discrete cosine transform operation on column data stored in one of the second set of registers.

11. The method of claim 7, wherein the second number of storage units is greater than or equal to the first number of registers.

12. The method of claim 7, wherein the first number of registers is equal to the second number of registers.

13. The method of claim 7, wherein the first set of registers comprise MMX™ registers, the first number of registers is eight, and the matrix of data comprises image data.

14. A system comprising:
   a memory;
   a processor coupled to the memory, the processor comprising:
      a first set of registers storing a matrix of data;
      a second set of registers storing a transpose of the matrix of data; and
      logic that automatically modifies the second set of registers so as to maintain the transposition relationship between the matrix of data stored in the first set of registers and the transpose of the matrix of data stored in the second set of registers, in response to a modification of the first set of registers.

15. The system of claim 14, wherein a modification of a row of the matrix of data in the first set of registers automatically results in a corresponding modification of a column of the transpose of the matrix of data in the second set of registers.

16. The system of claim 14, wherein the first set of registers comprises a first number of registers, each register comprising a first number of storage units, the second set of registers comprises a second number of registers, each register comprising a second number of storage units, and the second number of storage units is greater than or equal to the first number of registers.

17. The system of claim 16, wherein the first number of registers is equal to the second number of registers.

18. The system of claim 17, wherein the first set of registers comprise MMX™ registers, the first number of registers is eight, and the matrix of data comprises image data.

19. The system of claim 14, wherein the processor executes an instruction referencing one of the first set of registers to operate on a row of the matrix of data and executes an instruction referencing one of the second set of registers to operate on a column of the matrix of data.

20. A method of using two sets of registers for discrete cosine transform (DCT) processing of a matrix of image data by a processor comprising:
   storing the matrix into a first set of registers, the first set of registers comprising a first number of registers, each register comprising a first number of storage units, each storage unit storing an element of the matrix;
   transposing the matrix into a second set of registers, the second set of registers comprising a second number of registers, each register comprising a second number of storage units;
   automatically modifying the second set of registers, so as to maintain the transposition relationship between the matrix of data stored in the first set of registers and the transpose of the matrix of data stored in the second set of registers, in response to a modification of the first set of registers; and
   performing DCT processing, at least in part, by referencing one of the second set of registers to operate on a column of the matrix of data.

21. The method of claim 20, further comprising modifying a row of the matrix of data in the first set of registers and automatically modifying a corresponding column of the transpose of the matrix data in the second set of registers.

22. A processor comprising:
   a first set of registers storing a first matrix of data, with a first number of rows and a first number of columns;
   a first element in the first matrix of data, stored at a first row index and at a first column index;
   a second set of registers storing a second matrix of data, with a second number of rows and a second number of columns;
   a second element in the second matrix of data, stored at a second row index equal to the first column index, and at a second column index equal to the first row index (the second element hereinafter termed the rotated partner of the first element); and
   logic that automatically modifies the rotated partner of the first element in response to any modification of the first element.

23. The processor of claim 22 wherein the logic responds to any change in the value of the first element by automatically setting the rotated partner of the first element to the new value of the first element.

24. The processor of claim 23 further comprising logic that responds to any change in the value of the rotated partner of the first element by automatically setting the first element to the new value of the rotated partner of the first element.

25. The processor of claim 24, wherein:
the second number of rows is greater than or equal to the first number of columns; and
the second number of columns is greater than or equal to the first number of rows.

26. The processor of claim 25, further comprising logic to reference stored elements in a row of either the first or the second matrix of data with a single instruction.

27. The processor of claim 26 wherein:
the first set of registers comprises a first number of registers, each register comprising a first number of storage units;
the second set of registers comprises a second number of registers, each register comprising a second number of storage units; and
the second number of storage units is greater than or equal to the first number of registers.

28. The processor of claim 27, wherein the first number of registers is equal to the second number of registers.

29. The processor of claim 28, wherein the first set of registers comprise MMX registers, the first number of registers is eight, and the matrix of data comprises image data.

30. A method comprising:
storing a first matrix of data having a first element at a first row index and at a first column index, in a first set of registers;
storing a second matrix of data with a second number of rows, and a second number of columns, the second matrix having a second element at a second row index equal to the first column index, and at a second column index equal to the first row index (the second element hereinafter termed the rotated partner of the first element), in a second set of registers; and
automatically modifying the rotated partner of the first element in response to any modification of the first element.

31. The method of claim 30 wherein automatically modifying the rotated partner of the first element further comprises automatically setting the rotated partner of the first element to the new value of the first element.

32. The method of claim 31 further comprising automatically setting the first element to the new value of the rotated partner of the first element in response to any modification of the rotated partner of the first element.

33. The method of claim 32 wherein:
the second number of rows is greater than or equal to the first number of columns; and
the second number of columns is greater than or equal to the first number of rows.

34. The method of claim 33 further comprising:
storing a matrix of data into the first set of registers;
storing a transpose of the matrix of data into the second set of registers;
referencing one of the first set of registers to operate on a row of the matrix of data; and
referencing one of the second set of registers to operate on a column of the matrix of data.

35. The method of claim 34, further comprising performing a transform operation on column data stored in one of the second set of registers.

36. The method of claim 35, wherein performing the transform operation comprises performing a discrete cosine transform operation on column data stored in one of the second set of registers.

37. The method of claim 34, wherein the first set of registers comprises a first number of registers, each register comprising a first number of storage units, the second set of registers comprises a second number of registers, each register comprising a second number of storage units, and the second number of storage units is greater than or equal to the first number of registers.

38. The method of claim 37, wherein the first number of registers is equal to the second number of registers.

39. The method of claim 28, wherein the first set of registers comprise MMX registers, the first number of registers is eight, and the matrix of data comprises image data.

40. A system, including a processor coupled to a memory, the processor comprising:
a first set of registers storing a first matrix of data, with a first number of rows and a first number of columns;
a first element in the first matrix of data, stored at a first row index and at a first column index;
a second set of registers storing a second matrix of data, with a second number of rows, and a second number of columns;
a second element in the second matrix of data, stored at a second row index equal to the first column index, and at a second column index equal to the first row index (the second element hereinafter termed the rotated partner of the first element); and
logic that automatically modifies the rotated partner of the first element in response to any modification of the first element.

41. The system of claim 40 wherein the logic responds to any change in the value of the first element by automatically setting the rotated partner of the first element to the new value of the first element.

42. The system of claim 41 further comprising logic that responds to any change in the value of the rotated partner of the first element by automatically setting the first element to the new value of the rotated partner of the first element.

43. The system of claim 42, wherein:
the second number of rows is greater than or equal to the first number of columns; and
the second number of columns is greater than or equal to the first number of rows.

44. The system of claim 43 further comprising logic to reference stored elements in a row of either the first or the second matrix of data with a single instruction.

45. The system of claim 44, wherein the first set of registers comprises a first number of registers, each register comprising a first number of storage units, the second set of registers comprises a second number of registers, each register comprising a second number of storage units, and the second number of storage units is greater than or equal to the first number of registers.

46. The system of claim 45, wherein the first number of registers is equal to the second number of registers.

47. The system of claim 46, wherein the first set of registers comprise MMX registers, the first number of registers is eight, and the matrix of data comprises image data.

* * * * *